United States Patent
Kim et al.

(10) Patent No.: US 10,373,487 B2
(45) Date of Patent: Aug. 6, 2019

(54) METHOD AND APPARATUS FOR CONTROLLING LIGHTING DEVICE, USING VISIBLE LIGHT COMMUNICATION

(71) Applicant: YUYANG DNU CO., LTD, Hwaseong-si, Gyeonggi-do (KR)

(72) Inventors: Sangok Kim, Seoul (KR); Byungoh Kim, Suwon-si (KR); Dongsik Kim, Siheung-si (KR); Hyun-cheol Shim, Ansan-si (KR); Sang-ho Yoon, Suwon-si (KR)

(73) Assignee: YUYANG DNU CO., LTD (KR)

( * ) Notice: Subject to any disclaimer, the term of this patent is extended or adjusted under 35 U.S.C. 154(b) by 0 days.

(21) Appl. No.: 15/964,588

(22) Filed: Apr. 27, 2018

(65) Prior Publication Data

US 2018/0276985 A1  Sep. 27, 2018

Related U.S. Application Data (63) Continuation of application No. PCT/KR2016/007234, filed on Jul. 5, 2016.

(30) Foreign Application Priority Data

Oct. 28, 2015  (KR) .................. 10-2015-0150496

(51) Int. Cl.
  *G08C 23/04* (2006.01)
  *H05B 37/02* (2006.01)
  *H04B 10/116* (2013.01)

(52) U.S. Cl.
  CPC ........... *G08C 23/04* (2013.01); *H04B 10/116* (2013.01); *H05B 37/02* (2013.01); *H05B 37/0272* (2013.01)

(58) Field of Classification Search
  CPC .... G08C 23/04; G08C 19/28; G08C 2201/20; H04B 10/116; H04B 10/114; H05B 37/02; H05B 37/0272; H03J 9/06
  See application file for complete search history.

(56) References Cited

U.S. PATENT DOCUMENTS 8,007,127 B2   8/2011  Kim et al.
9,882,640 B1 *  1/2018  Chaudhuri ....... H04B 10/07953
(Continued)

FOREIGN PATENT DOCUMENTS

JP    2011109185 A    6/2011
KR   20110013331 A    2/2011
(Continued)

OTHER PUBLICATIONS

U.S. Appl. No. 15/850,560, filed Dec. 21, 2017, Kim, et al.
U.S. Appl. No. 15/939,767, filed Mar. 29, 2018, Kim, et al.
U.S. Appl. No. 15/958,309, filed Apr. 20, 2018, Kim, et al.

*Primary Examiner* — Ted M Wang
(74) *Attorney, Agent, or Firm* — Harness, Dickey & Pierce, P.L.C.

(57) ABSTRACT

The present embodiment provides a lighting control system including visible light communication modules separately corresponding to lighting devices, each visible light communication module including a body, and a pair of a light-emitting element and a light-receiving element provided on each of a plurality of outer surfaces of the body. Efficient visible-light-based lighting control services may be provided by transmitting or receiving visible light communication data for controlling lighting devices, to or from other visible light communication modules of front, rear, left, and right directions using the pair of the light-emitting and light-receiving elements.

17 Claims, 4 Drawing Sheets

(56) References Cited

U.S. PATENT DOCUMENTS

| | | | |
|---|---|---|---|
| 2008/0246623 A1* | 10/2008 | Nagashima | G01N 21/21 340/630 |
| 2013/0236183 A1* | 9/2013 | Chao | H04B 10/116 398/101 |
| 2015/0126200 A1 | 5/2015 | Wang et al. | |
| 2017/0258666 A1 | 9/2017 | Kim et al. | |
| 2017/0307382 A1 | 10/2017 | Kim et al. | |
| 2018/0065644 A1 | 3/2018 | Kim et al. | |
| 2018/0101875 A1 | 4/2018 | Kim et al. | |

FOREIGN PATENT DOCUMENTS

| | | |
|---|---|---|
| KR | 20110019617 A | 2/2011 |
| KR | 20130030925 A | 3/2013 |

\* cited by examiner

METHOD AND APPARATUS FOR CONTROLLING LIGHTING DEVICE, USING VISIBLE LIGHT COMMUNICATION

CROSS-REFERENCE TO RELATED APPLICATION

This application is a continuation of International Application No. PCT/KR2016/007234, filed Jul. 5, 2016, which claims priority under 35 U.S.C § 119(a) of Patent Application No. 10-2015-0150496, filed on Oct. 28, 2015 in Korea. The entire disclosures of each of the above applications are incorporated herein by reference.

TECHNICAL FIELD

The present invention relates to a method and apparatus for controlling lighting devices using visible light communication.

BACKGROUND

The statements in this section merely provide background information related to the present embodiment and do not necessarily constitute the prior art.

Currently, in addition to incandescent and fluorescent lamps, light-emitting diode (LED) modules are commonly used as lighting devices in houses or buildings. Compared to the incandescent and fluorescent lamps, the LED lighting devices have low power consumption, small size, light weight, and long lifespan.

Lighting control technology, e.g., dimming technology, refers to technology capable of saving energy by differently controlling lighting based on different circumstances. Meanwhile, in general, a plurality of LED lighting devices connected in series or in parallel have short lifespan and high power consumption because brightness values of the LED lighting devices cannot be individually controlled.

To solve the above problem, a lighting control system capable of reducing power consumption by controlling a plurality of LED lighting devices in groups has been proposed. However, since this conventional lighting control system mostly uses a central control method based on wired connection, a high initial installation cost is required, a cost recovery time is long compared to energy saving, and thus a large economic burden may be caused. As such, a central control method based on wireless connection using radio frequency (RF) communication, Zigbee, or the like is applied to a lighting control system. However, such system has low stability due to a high risk of malfunction depending on installation conditions.

SUMMARY

The present embodiment provides a lighting control system including visible light communication modules separately corresponding to lighting devices, each visible light communication module including a body, and a pair of a light-emitting element and a light-receiving element provided on each of a plurality of outer surfaces of the body. Efficient visible-light-based lighting control services may be provided by transmitting or receiving visible light communication data for controlling lighting devices, to or from other visible light communication modules of front, rear, left, and right directions using the pair of the light-emitting and light-receiving elements.

In accordance with some embodiments of the present disclosure, a visible light communication module, for controlling a lighting device using visible light, comprises a body; a first communication unit comprising a pair of a light-emitting element and a light-receiving element provided on each of a plurality of outer surfaces of the body, to transmit or receive visible light communication data to or from other visible light communication modules using the pair of the light-emitting and light-receiving elements; and a controller for controlling operation of a lighting device corresponding to the visible light communication module based on the visible light communication data.

In accordance with some embodiments of the present disclosure, a lighting control system using visible light, the lighting control system comprises lighting devices; and visible light communication modules separately corresponding to the lighting devices, wherein each visible light communication module comprises a body and a pair of a light-emitting element and a light-receiving element provided on each of a plurality of outer surfaces of the body, transmits or receives visible light communication data to or from other visible light communication modules using the pair of the light-emitting and light-receiving elements, and controls operation of a lighting device corresponding to the visible light communication module based on the visible light communication data.

In accordance with some embodiments of the present disclosure, a method of controlling lighting devices in a lighting control system comprising the lighting devices, and visible light communication modules separately corresponding to the lighting devices, each visible light communication module comprising a body and a pair of a light-emitting element and a light-receiving element provided on each of a plurality of outer surfaces of the body, the method comprises: transmitting or receiving, by each visible light communication module, visible light communication data to or from other visible light communication modules using the pair of the light-emitting and light-receiving elements; and controlling, by each visible light communication module, operation of a lighting device corresponding to the visible light communication module based on the visible light communication data.

REFERENCE NUMERALS

| | |
|---|---|
| 100: lighting control system | 110: visible light communication module |
| 120: lighting device | 130: user equipment |
| 200: body | 210: light-emitting element |
| 220: light-receiving element | 230: wireless communication module |
| 300: first communication unit | 310: second communication unit |
| 320: coordinator setter | 330: group former |
| 340: controller, | |

DETAILED DESCRIPTION

Hereinafter, the present embodiment will be described in detail with reference to the attached drawings.

Figure 1:
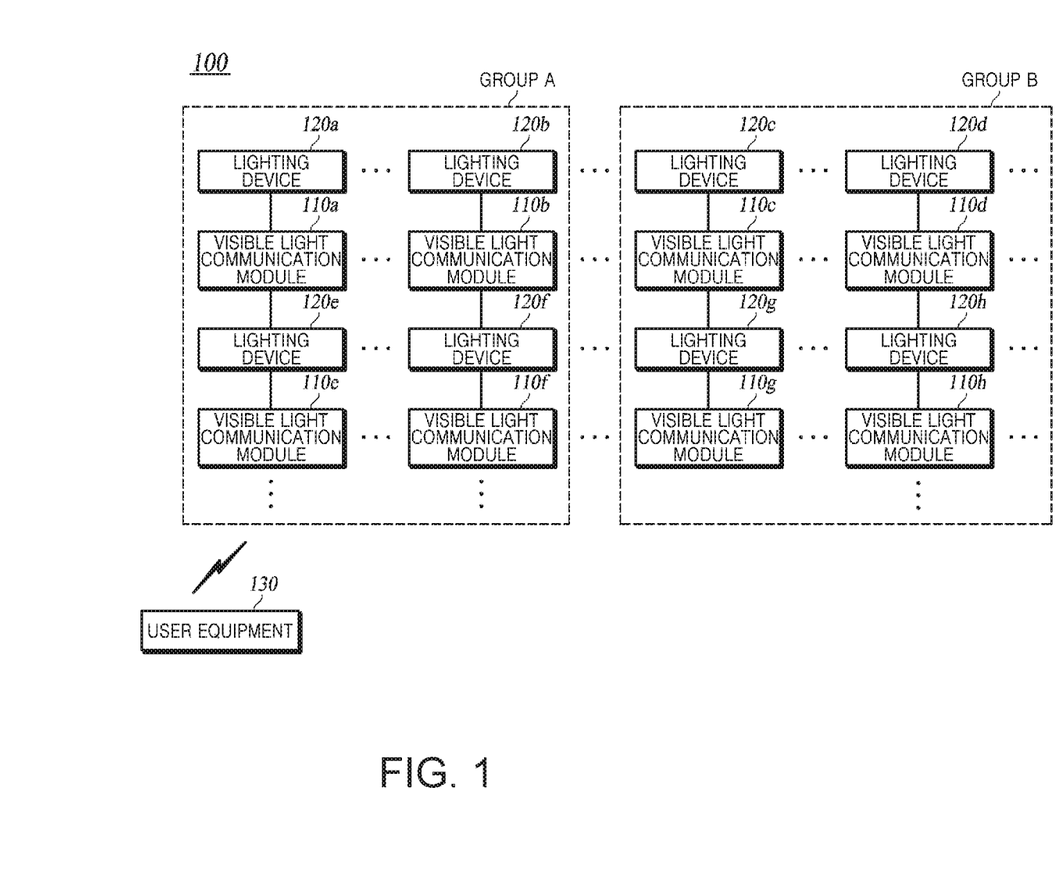
FIG. 1 is a block diagram of a lighting control system according to the present embodiment.

FIG. 1 is a block diagram of a lighting control system 100 according to the present embodiment.

The lighting control system 100 according to the present embodiment includes visible light communication modules for visible light communication, and may provide efficient visible-light-based lighting control services by transmitting or receiving visible light communication data for controlling lighting devices, to or from other visible light communication modules included in the lighting control system 100.

As illustrated in FIG. 1, the lighting control system 100 according to the present embodiment includes one or more visible light communication modules 110, lighting devices 120 separately corresponding to the visible light communication modules 110, and a user equipment 130. Herein, the elements included in the lighting control system 100 are not limited thereto.

The visible light communication module 110 refers to a device for transmitting or receiving visible light communication data to or from other visible light communication modules in the lighting control system 100 using visible light, and controlling operation of the lighting device 120 based on the visible light communication data. In this case, the visible light communication data transmitted or received by the visible light communication module 110 includes a control signal for controlling the lighting devices 120 included in the lighting control system 100.

A plurality of visible light communication modules 110 are provided to separately correspond to a plurality of lighting devices 120 included in the lighting control system 100, and control operations of the corresponding lighting devices 120.

The visible light communication module 110 according to the present embodiment has a body of a radial structure capable of enabling transmission or reception of data to or from other visible light communication modules located in all directions. The visible light communication module 110 includes a pair of a light-emitting element and a light-receiving element provided on each of a plurality of outer surfaces of the body, and thus transmits or receives visible light communication data to or from other visible light communication modules in front, rear, left, and right directions. That is, each of the plurality of visible light communication modules 110 included in the lighting control system 100 receives visible light communication data from other visible light communication modules in front, rear, left, and right directions, and transmits the received visible light communication data to still other visible light communication modules located in front and rear directions.

Due to the above-described structure and operation of the visible light communication module 110, all visible light communication modules in the lighting control system 100 may form a visible-light-based communication network therebetween. As such, a user may easily control every lighting device included in the lighting control system 100, irrespective of a current location of the user and the location of the lighting device 120 to be controlled.

The visible light communication module 110 extracts a control signal for controlling a lighting device corresponding to the visible light communication module 110, based on the received visible light communication data, and controls operation of the corresponding lighting device based on the extracted control signal.

Roles of the visible light communication modules 110 in the lighting control system 100 may be set based on input information received from the user. For example, each visible light communication module 110 is set as a coordinator visible light communication module or a follower visible light communication module based on the input information received from the user. The coordinator visible light communication module operates to control a plurality of visible light communication modules included in the lighting control system 100. The follower visible light communication module operates to receive a control signal from a first visible light communication module included in the lighting control system 100, and control a lighting device corresponding to the follower visible light communication module. In this case, the first visible light communication module may be the coordinator visible light communication module, but is not limited thereto.

In the following description, it is assumed that a visible light communication module 110e of FIG. 1 operates as a coordinator visible light communication module.

When a control signal for controlling lighting devices controlled by the lighting control system 100 is received from the user using the user equipment 130, each visible light communication module 110 determines whether the visible light communication module 110 is a coordinator visible light communication module or a follower visible light communication module. In this case, the visible light communication module 110e set as a coordinator visible light communication module (hereinafter referred to as the coordinator visible light communication module 110e) generates visible light signals corresponding to the control signal received from the user, and transmits the generated visible light signals to other visible light communication modules. Meanwhile, visible light communication modules set as follower visible light communication modules (hereinafter referred to as the follower visible light communication modules) do not generate visible light signals corresponding to the control signal irrespective of whether the control signal for controlling lighting devices is received.

The visible light communication module 110 may generate the visible light signals corresponding to the control signal by controlling operation of a lighting device connected to the visible light communication module 110, or using a separate visible light signal generator.

The coordinator visible light communication module 110e allows the follower visible light communication modules to check an error of the coordinator visible light communication module 110e, by periodically transmitting status information of the coordinator visible light communication module 110e to other visible light communication modules. For example, when the status information of the coordinator visible light communication module 110e is not received from the coordinator visible light communication module 110e for a certain period of time, each follower visible light communication module determines that the coordinator visible light communication module 110e has an error.

In this case, a visible light communication module designated as a second-priority coordinator candidate among a plurality of follower visible light communication modules is changed from a follower visible light communication module to a coordinator visible light communication module. To this end, the input information received by the visible light communication module 110 from the user may include not only information about a first-priority coordinator candidate but also information about a second-priority coordinator candidate for replacing the first-priority coordinator candidate.

The visible light communication module 110 may form a group together with one or more other visible light communication modules in the lighting control system 100 based on the input information received from the user.

For example, in FIG. 1, the visible light communication modules in the lighting control system 100 form two groups, e.g., group A and group B.

Similarly to the above description, each visible light communication module included in each group may be set as a coordinator visible light communication module or a follower visible light communication module based on the input information received from the user.

When visible light communication data is received from the coordinator visible light communication module 110e operating as a coordinator for all visible light communication modules in the lighting control system 100, a coordinator visible light communication module in a group (e.g., group B in which a visible light communication module 110c operates as a coordinator visible light communication module) generates a control signal for controlling a plurality of visible light communication modules, e.g., follower visible light communication modules, included in the group, based on the received visible light communication data. The coordinator visible light communication module 110c generates visible light signals corresponding to the generated control signal, and transmits the visible light signals to the other visible light communication modules.

The coordinator visible light communication module 110c instantaneously transmits the visible light communication data received from the coordinator visible light communication module 110e operating as a coordinator for all visible light communication modules in the lighting control system 100, to the other visible light communication modules, but transmits the visible light signals generated by the coordinator visible light communication module 110c, to the other visible light communication modules at certain timings based on a preset order per group. In the present embodiment, since all visible light communication modules in the lighting control system 100 share visible light communication data, when multiple pieces of visible light communication data are simultaneously transmitted, interference may occur therebetween. In this case, as each visible light communication module controls a lighting device corresponding thereto based on the visible light communication data having interference, the lighting device can malfunction. Considering this, according to the present embodiment, a coordinator visible light communication module in each group outputs visible light signals generated by the coordinator visible light communication module, at different timings, thereby preventing the problem caused when multiple pieces of visible light communication data are simultaneously transmitted.

The preset order per group may be determined based on the input information received from the user, or by sharing information between visible light communication modules.

Each lighting device 120 is connected to the visible light communication module 110 corresponding thereto, and changes the state thereof based on a control signal received from the visible light communication module 110. For example, each lighting device 120 may change a light-emitting element thereof to a full power mode or a power save mode, or to an on or off state based on a control signal received from the visible light communication module 110 corresponding to the lighting device 120.

A plurality of lighting devices 120 may be provided within an illumination area, and may be implemented as light-emitting diodes (LEDs) without being limited thereto.

The user equipment 130 refers to a device for sending a control signal for controlling the visible light communication modules 110 included in the lighting control system 100 and the lighting devices 120 corresponding to the visible light communication modules 110, using wireless communication.

The user equipment 130 refers to any equipment capable of transmitting or receiving various types of data based on key manipulation of a user using a communication relaying device including an access point (AP), and may be one of a tablet PC, a laptop computer, a personal computer (PC), a smartphone, a personal digital assistant (PDA), a mobile communication terminal, an Internet of things (IoT) controller, etc.

The user equipment 130 according to the present embodiment may have a lighting control application (not shown) installed therein to control the plurality of lighting devices 120 included in the lighting control system 100. The lighting control application refers to an application which is installed after being downloaded via an application store when the user equipment 130 is implemented as a smartphone, or refers to an application which is driven on a virtual machine (VM) downloaded via a server of a mobile carrier when the user equipment 130 is implemented as a feature phone.

Figure 2:
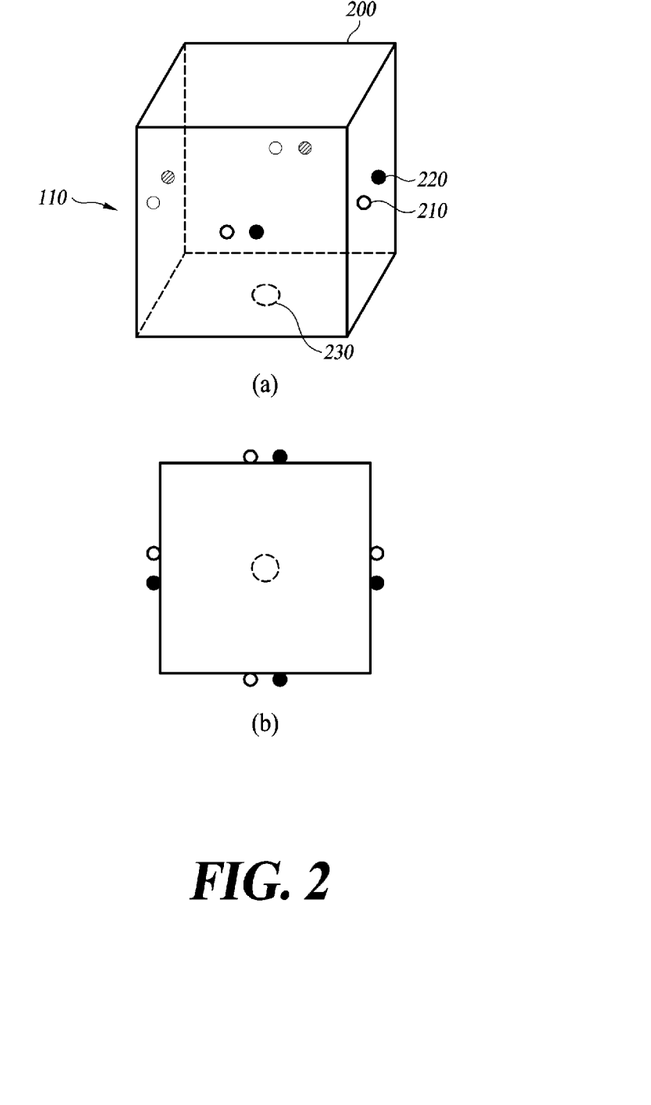
FIG. 2 illustrates the shape of a visible light communication module according to the present embodiment.

FIG. 2 illustrates the shape of the visible light communication module 110 according to the present embodiment.

As illustrated in FIG. 2, the visible light communication module 110 according to the present embodiment has a shape including a body 200, and a pair of a light-emitting element 210 and a light-receiving element 220 provided on each of a plurality of outer surfaces of the body 200. Meanwhile, FIG. 2(a) is a perspective view of the visible light communication module 110 according to the present embodiment, and FIG. 2(b) is a bottom view of the visible light communication module 110 according to the present embodiment.

The body 200 has a radial structure capable of enabling transmission or reception of data to or from other visible light communication modules located in all directions of the visible light communication module 110. For example, the body 200 may have a cube shape capable of enabling transmission or reception of visible light communication data to or from other visible light communication modules located in front, rear, left, and right directions of the visible light communication module 110. The body 200 has a cube shape in FIG. 2, but is not limited thereto. The body 200 may have any structure capable of enabling transmission or reception of data to or from other visible light communication modules located in all directions of the visible light communication module 110.

The pair of the light-emitting and light-receiving elements 210 and 220 are provided on each of the plurality of outer surfaces of the body 200. For example, when the body 200 has a cube shape, the pair of the light-emitting and light-receiving elements 210 and 220 may be provided on each of four outer surfaces of the body 200.

The visible light communication module 110 according to the present embodiment includes the body 200 having a structure capable of enabling transmission or reception of data to or from other visible light communication modules located in all directions of the visible light communication module 110, and the pair of the light-emitting and light-receiving elements 210 and 220 provided on each of the plurality of outer surfaces of the body 200, and thus may transmit or receive visible light communication data to or from other visible light communication modules in front, rear, left, and right directions of the visible light communication module 110.

A wireless communication module 230 is provided on a surface of the body 200. The wireless communication module 230 receives, from the user equipment 130, a control signal for controlling the visible light communication module 110 and a lighting device including the visible light communication module 110. The wireless communication module 230 is provided on a bottom surface of the body 200 in FIG. 2, but is not limited thereto.

Figure 3:
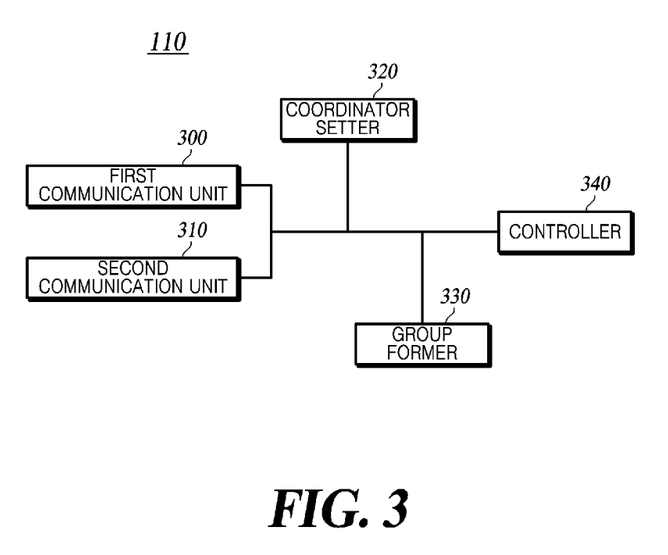
FIG. 3 is a block diagram of functional modules of the visible light communication module according to the present embodiment.

FIG. 3 is a block diagram of functional modules of the visible light communication module 110 according to the present embodiment.

As illustrated in FIG. 3, the functional modules of the visible light communication module 110 according to the present embodiment include a first communication unit 300, a second communication unit 310, a coordinator setter 320, a group former 330, and a controller 340.

The first communication unit 300 refers to a device for transmitting or receiving visible light communication data to or from other visible light communication modules in the lighting control system 100 using visible light communication.

The first communication unit 300 includes the pair of the light-emitting and light-receiving elements 210 and 220 provided on each of the plurality of outer surfaces of the body 200 of the visible light communication module 110, and transmits or receives visible light communication data to or from other visible light communication modules using the pair of the light-emitting and light-receiving elements 210 and 220. In this case, the visible light communication data transmitted or received by the first communication unit 300 includes a control signal for controlling the lighting devices 120 included in the lighting control system 100.

The second communication unit 310 includes the wireless communication module 230, and refers to a device for transmitting or receiving wireless communication data to or from an external device, e.g., the user equipment 130, using the wireless communication module 230.

The second communication unit 310 is provided on a surface of the visible light communication module 110, and receives a control signal for controlling the lighting device 120 controlled by the visible light communication module 110 and the lighting control system 100 including the visible light communication module 110, using the wireless communication module 230.

The wireless communication module 230 included in the second communication unit 310 may be an infrared sensor, but is not limited thereto. For example, the wireless communication module 230 included in the second communication unit 310 may support all or a part of wireless communication protocols such as Bluetooth, WiFi, Zigbee, Z-wave, and wideband code division multiple access (WCDMA).

The coordinator setter 320 sets the visible light communication module 110 as a coordinator visible light communication module and a follower visible light communication module based on input information received from a user.

In this case, the input information to be received from the user may be received using the second communication unit 310 or using a separate user interface (not shown) included in the visible light communication module 110.

Meanwhile, the visible light communication module 110 according to the present embodiment may form a group together with one or more other visible light communication modules in the lighting control system 100 based on the input information received from the user. In this case, similarly to the above description, the coordinator setter 320 may set the visible light communication module 110 as a coordinator visible light communication module or a follower visible light communication module in the group.

When status information is not received from a visible light communication module operating as a coordinator visible light communication module in the lighting control system 100, for a certain period of time, the coordinator setter 320 determines whether the visible light communication module 110 is a second-priority coordinator visible light communication module. Upon determining that the visible light communication module 110 is the second-priority coordinator visible light communication module, the coordinator setter 320 changes the visible light communication module 110 from a follower visible light communication module to a coordinator visible light communication module.

The group former 330 groups the visible light communication module 110 with one or more other visible light communication modules in the lighting control system 100 based on the input information received from the user.

The group former 330 obtains a list of visible light communication modules to be grouped with the visible light communication module 110 in the lighting control system 100, based on the input information received from the user, and groups the visible light communication module 110 with the visible light communication modules included in the obtained list. The grouping may be performed by forming a visible-light-based overlay network between visible light communication modules.

The controller 340 controls operation of the lighting device 120 corresponding to the visible light communication module 110 based on the visible light communication data transmitted or received using the first communication unit 300. The controller 340 extracts a control signal for controlling a lighting device corresponding to the visible light communication module 110 based on the received visible light communication data using the first communication unit 300, and controls operation of the corresponding lighting device based on the extracted control signal.

The controller 340 controls the visible light communication module 110 to operate as a coordinator visible light communication module or a follower visible light communication module, based on setting information set by the coordinator setter 320. For example, when the visible light communication module 110 is set as a coordinator visible light communication module and a control signal for controlling lighting devices is received from the user equipment 130, the controller 340 generates visible light signals corresponding to the control signal. The controller 340 controls the generated visible light signals to be transmitted to the other visible light communication modules using the first communication unit 300.

When the visible light communication module 110 is set as a coordinator visible light communication module, the controller 340 repeatedly collects status information of the visible light communication module 110, and periodically transmits the collected status information to the other visible light communication modules.

The controller 340 controls the visible light communication module 110 to be grouped with one or more other visible light communication modules in the lighting control system 100, based on group information set by the group former 330. Similarly to the above description, the controller 340 controls the visible light communication module 110 to operate as a coordinator visible light communication module or a follower visible light communication module in the group, based on the setting information set by the coordinator setter 320.

When the visible light communication module 110 is set as a coordinator visible light communication module in the group, the controller 340 generates a control signal for controlling follower visible light communication modules in the group based on the received visible light communication data using the first communication unit 300. The controller 340 generates visible light signals corresponding to the generated control signal, and controls the generated visible light signals to be transmitted to the other visible light communication modules using the first communication unit 300.

The controller 340 controls the visible light communication data received from the coordinator visible light communication module 110e, to be instantaneously transmitted to the other visible light communication modules, but controls the visible light signals generated by the visible light communication module 110, to be transmitted to the other visible light communication modules at certain timings based on a preset order per group, using the first communication unit 300.

Figure 4:
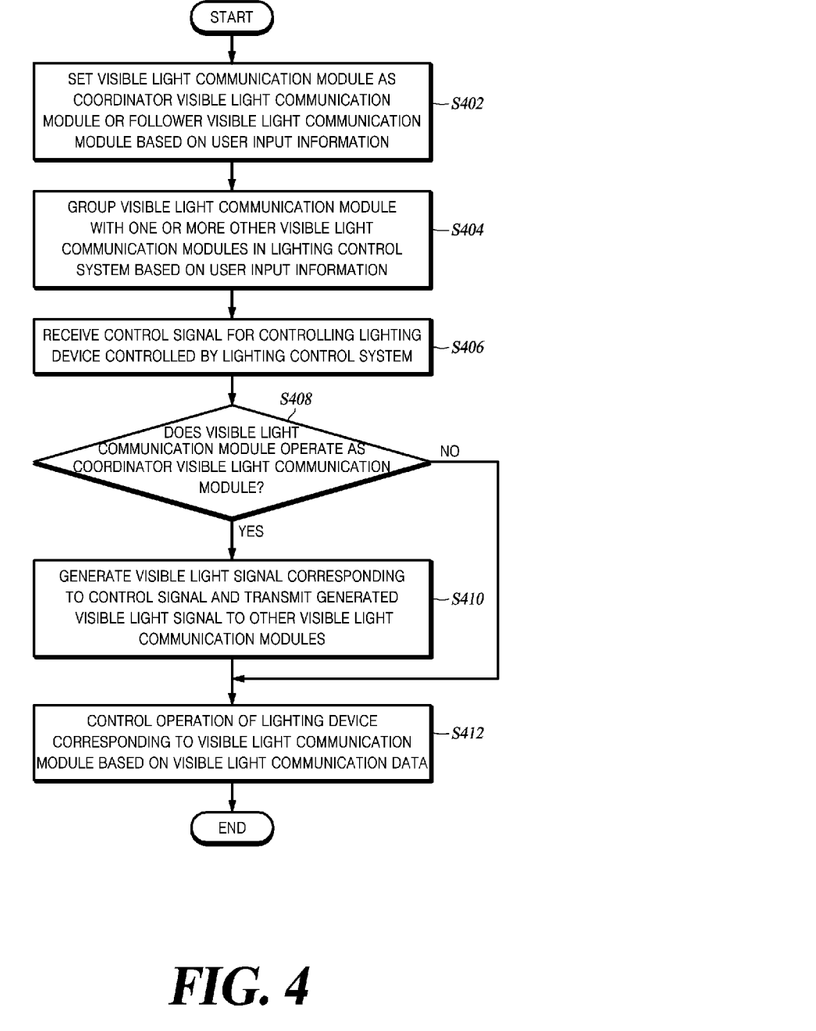
FIG. 4 is a flowchart of a lighting device control method using visual light communication, according to the present embodiment.

FIG. 4 is a flowchart of a lighting device control method using visual light communication, according to the present embodiment.

Roles of the visible light communication modules 110 included in the lighting control system 100 are set based on input information received from a user (S402). In step S402, the visible light communication module 110 is set as a coordinator visible light communication module or a follower visible light communication module based on the input information received from the user.

The visible light communication module 110 forms a group together with one or more other visible light communication modules in the lighting control system 100 based on the input information received from the user (S404). Step S404 may be optionally performed based on whether input information about grouping is received from the user.

In step S404, similarly to step S402, the visible light communication module 110 may set a role of the visible light communication module 110 in the group based on the input information received from the user.

The visible light communication module 110 receives a control signal for controlling lighting devices controlled by the lighting control system 100, from the user (S406).

When the control signal for controlling lighting devices is received in step S406, the visible light communication module 110 determines whether the visible light communication module 110 is a coordinator visible light communication module or a follower visible light communication module, based on the setting result of step S402 (S408).

Upon determining that the visible light communication module 110 is a coordinator visible light communication module in step S408, the visible light communication module 110 generates visible light signals corresponding to the control signal received in step S406, and transmits the generated visible light signals to the other visible light communication modules (S410).

Otherwise, upon determining that the visible light communication module 110 is a follower visible light communication module in step S408, the visible light communication module 110 does not generate visible light signals corresponding to the control signal irrespective of whether the control signal for controlling lighting devices is received. Then, the visible light communication module 110 receives visible light communication data generated and transmitted from a coordinator visible light communication module in the lighting control system 100, using visual light communication with the other visible light communication modules.

The visible light communication module 110 controls operation of the lighting device 120 corresponding to the visible light communication module 110 based on the visible light communication data generated in step S410 (S412).

Herein, steps S402 to S412 correspond to the above-described operations of the elements of the visible light communication module 110, and thus detailed descriptions thereof are not provided herein.

According to the present embodiment, visible light communication modules are provided to separately correspond to lighting devices included in a lighting control system, and each visible light communication module includes a body and a pair of a light-emitting element and a light-receiving element provided on each of a plurality of outer surfaces of the body, and transmits or receives visible light communication data for controlling lighting devices, to or from other visible light communication modules in front, rear, left, and right directions by using the pair of the light-emitting and light-receiving elements. As such, efficient visible-light-based lighting control services may be provided.

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A visible light communication module for controlling a lighting device using visible light, the visible light communication module comprising:
   a body;
   a first communication unit comprising a pair of a light-emitting element and a light-receiving element provided on each of a plurality of outer surfaces of the body, to transmit or receive visible light communication data to or from other visible light communication modules using the pair of the light-emitting and light-receiving elements;
   a controller for controlling operation of a lighting device corresponding to the visible light communication module based on the visible light communication data;
   a coordinator setter for setting the visible light communication module as a coordinator visible light communication module for controlling a plurality of visible light communication modules comprised in a lighting control system comprising the visible light communication module, or a follower visible light communication module for receiving a control signal from a first visible light communication module comprised in the lighting control system and controlling operation of a lighting device corresponding to the follower visible light communication module, based on input information received from a user; and
   a group former for grouping the visible light communication module with one or more other visible light communication modules in the lighting control system based on the input information.

2. The visible light communication module according to claim 1, wherein the body has a cube shape, and
   wherein the pair of the light-emitting and light-receiving elements for transmitting or receiving the visible light communication data are provided on each of four outer surfaces of the body.

3. The visible light communication module according to claim 1, further comprising a second communication unit provided on a surface of the body to receive a control signal for controlling the lighting device controlled by the visible light communication module and a lighting control system comprising the visible light communication module, using wireless communication.

4. The visible light communication module according to claim 1, wherein, when a control signal for controlling a lighting device controlled by the lighting control system is received as the input information, the controller determines whether the visible light communication module operates as the coordinator visible light communication module, and optionally generates visible light signals corresponding to the control signal and transmits the visible light signals to the other visible light communication modules based on a result of determination.

5. A lighting control system using visible light, the lighting control system comprising:
  lighting devices; and
  visible light communication modules separately corresponding to the lighting devices,
    wherein each visible light communication module comprises a body and a pair of a light-emitting element and a light-receiving element provided on each of a plurality of outer surfaces of the body, transmits or receives visible light communication data to or from other visible light communication modules using the pair of the light-emitting and light-receiving elements, and controls operation of a lighting device corresponding to the visible light communication module based on the visible light communication data; and
    wherein each visible light communication module is set as a coordinator visible light communication module for controlling a plurality of visible light communication modules comprised in the lighting control system, or a follower visible light communication module for receiving a control signal from a first visible light communication module comprised in the lighting control system and controlling operation of a lighting device corresponding to the follower visible light communication module, based on input information received from a user.

6. The lighting control system according to claim 5, wherein, when a control signal for controlling the lighting device controlled by the lighting control system is received, the coordinator visible light communication module among the visible light communication modules generates visible light signals corresponding to the control signal and transmits the generated visible light signals to the other visible light communication modules.

7. The lighting control system according to claim 6, wherein the coordinator visible light communication module periodically transmits status information of the coordinator visible light communication module to the other visible light communication modules, and
  wherein each visible light communication module determines that the coordinator visible light communication module has an error, when the status information is not received from the coordinator visible light communication module for a certain period of time.

8. The lighting control system according to claim 7, wherein, upon determining that the coordinator visible light communication module has an error, a visible light communication module designated as a second-priority coordinator candidate among the visible light communication modules based on the input information is changed from the follower visible light communication module to the coordinator visible light communication module.

9. The lighting control system according to claim 5, wherein each visible light communication module forms a group together with one or more other visible light communication modules in the lighting control system based on input information received from a user.

10. The lighting control system according to claim 9, wherein each visible light communication module comprised in the group is set as a coordinator visible light communication module for controlling a plurality of visible light communication modules comprised in the group, or a follower visible light communication module for receiving a control signal from a first visible light communication module comprised in the group and controlling operation of a lighting device corresponding to the follower visible light communication module, based on the input information.

11. The lighting control system according to claim 10, wherein, when the visible light communication data is received, the coordinator visible light communication module in the group generates a control signal for controlling a plurality of visible light communication modules comprised in the group, based on the visible light communication data, and generates visible light signals corresponding to the control signal and transmits the generated visible light signals to the other visible light communication modules.

12. The lighting control system according to claim 11, wherein the coordinator visible light communication module in the group instantaneously transmits the visible light communication data to the other visible light communication modules, and transmits the visible light signals corresponding to the control signal to the other visible light communication modules at certain timings based on a preset order per group.

13. A method of controlling a lighting control system including lighting devices and visible light communication modules separately corresponding to the lighting devices, each visible light communication module having a body, a pair of a light-emitting elements, and a light-receiving element provided on each of a plurality of outer surfaces of the body, the method comprising:
  transmitting or receiving, by each visible light communication module, visible light communication data to or from other visible light communication modules using the pair of the light-emitting and light-receiving elements;
  controlling, by each visible light communication module, operation of a lighting device corresponding to the visible light communication module based on the visible light communication data; and
  setting each visible light communication module as a coordinator visible light communication module for controlling a plurality of visible light communication modules comprised in the lighting control system, or a follower visible light communication module for receiving a control signal from a first visible light communication module comprised in the lighting control system and controlling operation of a lighting device corresponding to the follower visible light communication module, based on input information received from a user.

14. The method according to claim 13, further comprising, when a control signal for controlling a lighting device controlled by the lighting control system is received, generating visible light signals corresponding to the control signal and transmitting the generated visible light signals to the other visible light communication modules by the coordinator visible light communication module among the visible light communication modules.

15. The method according to claim 13, further comprising forming, by each visible light communication module, a group together with one or more other visible light communication modules in the lighting control system based on input information received from a user.

16. A lighting control system using visible light, the lighting control system comprising:
   lighting devices; and
   visible light communication modules separately corresponding to the lighting devices,
   wherein each visible light communication module comprises a body and a pair of a light-emitting element and a light-receiving element provided on each of a plurality of outer surfaces of the body, transmits or receives visible light communication data to or from other visible light communication modules using the pair of the light-emitting and light-receiving elements, and controls operation of a lighting device corresponding to the visible light communication module based on the visible light communication data; and
   wherein each visible light communication module forms a group together with one or more other visible light communication modules in the lighting control system based on input information received from a user.

17. A method of controlling a lighting control system including lighting devices and visible light communication modules separately corresponding to the lighting devices, each visible light communication module having a body, a pair of a light-emitting elements, and a light-receiving element provided on each of a plurality of outer surfaces of the body, the method comprising:
   transmitting or receiving, by each visible light communication module, visible light communication data to or from other visible light communication modules using the pair of the light-emitting and light-receiving elements;
   controlling, by each visible light communication module, operation of a lighting device corresponding to the visible light communication module based on the visible light communication data; and
   forming, by each visible light communication module, a group together with one or more other visible light communication modules in the lighting control system based on input information received from a user.

* * * * *